United States Patent [19]
Smith et al.

[11] Patent Number: 5,979,488
[45] Date of Patent: Nov. 9, 1999

[54] BLEED SYSTEM

[75] Inventors: Gordon M. Smith, Brookshire; Kevin W. Lilie, Columbus, both of Tex.

[73] Assignee: Johnston Pump/General Valve, Inc., Brookshire, Tex.

[21] Appl. No.: 09/112,530

[22] Filed: Jul. 9, 1998

[51] Int. Cl.$^6$ .................................................. F16K 24/02
[52] U.S. Cl. .......................... 137/312; 137/517; 137/599
[58] Field of Search ........................... 137/312, 599, 137/517, 614.11

[56] References Cited

U.S. PATENT DOCUMENTS

| | | | |
|---|---|---|---|
| 2,038,132 | 4/1936 | Robinson et al. .................. | 137/312 X |
| 3,060,964 | 10/1962 | Bagwell .................................. | 137/599 |
| 3,135,284 | 6/1964 | Magos .................................... | 137/599 |
| 4,749,002 | 6/1988 | Lembser ................................. | 137/312 |
| 4,848,401 | 7/1989 | Devilleger et al. ..................... | 137/599 |

*Primary Examiner*—Stephen M. Hepperle
*Attorney, Agent, or Firm*—Leonard Tachner

[57] ABSTRACT

An improved bleed system for a double block and bleed plug-type valve which employ a safety check valve which automatically shuts off bleed system flow upon ruptures or upon an inadvertently open manual bleed valve during normal plug valve operation. An integral component combines the safety check valve and other bleed system components in a unitary device which is especially resistant to plumbing damage incidents.

6 Claims, 5 Drawing Sheets

SCHEMATIC OF DIFFERENTIAL THERMAL RELIEF W/MBV AND SAFETY CHECKS INSTALLED AT BODY & THROAT TAPS

BLEED SYSTEM

BACKGROUND OF THE INVENTION

1. Field of the Invention

The invention disclosed herein relates generally to the field of plug valves and more specifically to a bleed system for double block and bleed plug valves for avoiding dangerously high pressure build up in liquid filled, positive shut-off situations.

2. Prior Art

When a double block plug valve is closed and completely filled with liquid media, slight variations in temperature can cause drastic changes in body cavity pressure resulting from thermal expansion and media incompressibility. Valves filled with fuel oil in a laboratory setting have exhibited a 75 PSI increase in pressure with a temperature rise of only 1° Fahrenheit.

While results vary under actual service conditions depending on media, pressure vessel rigidity and pressure of entrained gas, it is known that dangerously high pressure will build up in liquid filled positive shut-off valves. Therefore, double block plug valves in liquid service require a pressure relief device.

Various methods of pressure relief have been implemented in the prior art. The differential thermal relief (DTR) system is one example. A relief valve mounted at a tee on the valve bonnet, pipes excess pressure to the upstream throat of the valve. The standard relief valve is sometimes set to open at 25 PSI on all valves regardless of working pressure. With the valve closed the relief valve will open at 25 PSI above upstream pressure. This system functions only when the valve is closed. A manual body bleed valve is included. This bleed valve, installed at the tee, is opened after the valve is closed. Seal effectiveness can be immediately evaluated. This bleed valve must be closed before the valve is reopened. An isolation valve installed in the upstream throat tap is also included. It must be left open to permit the relief system to relieve pressure upstream and is closed only for repair.

A Manual Body Bleed Valve (MBBV) is another prior art example. This bleed valve installed in the body cavity is opened after the valve is closed. Seal effectiveness can be immediately evaluated. This bleed valve must be closed before the valve is reopened.

The Automatic Body Bleed Valve (ABBV) provides visual, positive assurance that the valve has sealed completely at each cycling operation and prevents thermal pressure buildup in the body cavity. An automatic bleed valve connected to the body cavity of the main valve is mechanically opened by the valve operator when the valve is closed. Seal integrity is indicated by viewing the discharge of the bleed valve. When the valve is opened, the bleed valve is automatically closed by the combination of line pressure and the spring in the bleed valve.

All of these methods protect the valve body from overpressurization, but also increase the risk of an accident or incident due to the relative delicacy of the exposed "plumbing". As a result, more recent state of the art pressure relief systems have become quite popular. The Welded/DTR functions as a basic DTR but all pipe threads are seal welded, except for the relief valve which is installed between a set of seal welded unions. This essentially all-welded system provides enhanced incident control where safety and the environment are of the foremost concern. The Safety Bleed/DTR functions exactly as the basic DTR. However, all working components are housed in a virtually indestructible compact steel manifold. The benefits of this incident control equipment are improved fire safety, complete component access for maintenance purposes, all stainless steel components, all socket welded joints, heavy wall pipe and total incident control. However, as the pressure protection systems become more robust for enhanced incident protection they also get more costly and cumbersome.

There is therefore a continuing need for a bleed system having reduced cost and size while maintaining incident control. Moreover, such bleed systems must be fugitive emission free; must be fire safe; and must be strong and resist spillage of contents.

SUMMARY OF THE INVENTION

An improved bleed system for a double block and bleed plug-type valve which may employ a safety check valve which automatically shuts off bleed system flow upon ruptures or upon an inadvertently open manual bleed valve during normal plug valve operation. An integrated embodiment combines the safety check valve and other bleed system components in a unitary system which is especially resistant to plumbing damage incidents.

The present invention comprises at least one safety check valve, a relief valve, a pair of manual valves, a tee, a pair of nipples and a pair of tops. In a preferred embodiment, a safety check valve, relief valve, tee and one manual valve are provided in an integrated unitary component which comprises a fusible or frangible link. The invention can be manufactured for less than the cost of the needle valve and check valve provided separately.

The most important feature of these inventive devices is that they exceed the original objectives of incident control. Not only do they protect from catastrophic equipment failure, but they protect the user from his own negligence. If when seated, the bleed is opened and left in that position during the reopening activation, the safety check will shut off excess flow automatically.

The undercut fusible or frangible link provides break point control with the safety check valve on the flow-controlled side of a possible rupture.

OBJECTS OF THE INVENTION

It is therefor a principal object of the present invention to provide an improved bleed system for double block and bleed plug valves wherein unrestricted flow from bleed system rupture or from inadvertently open bleed valves is prevented.

It is another object of the invention to provide an improved bleed system for double block and bleed plug valves wherein the bleed system is integrated into a unitary structure which resists mechanically damaging incidents which might otherwise cause catastrophic leaks.

It is still another object of the invention to provide a bleed system which is rupture resistant while still being of low cost construction and mechanically uncomplicated.

It is yet another object of the invention to provide a bleed system which is resistant to accident-induced uncontrolled flow even under extreme mechanical stress sufficient to cause component rupture.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 3b is a diagrammatic illustration of a bleed system implemented with the component shown in FIG. 3a;

DETAILED DESCRIPTION OF THE PREFERRED EMBODIMENTS

Figure 1:
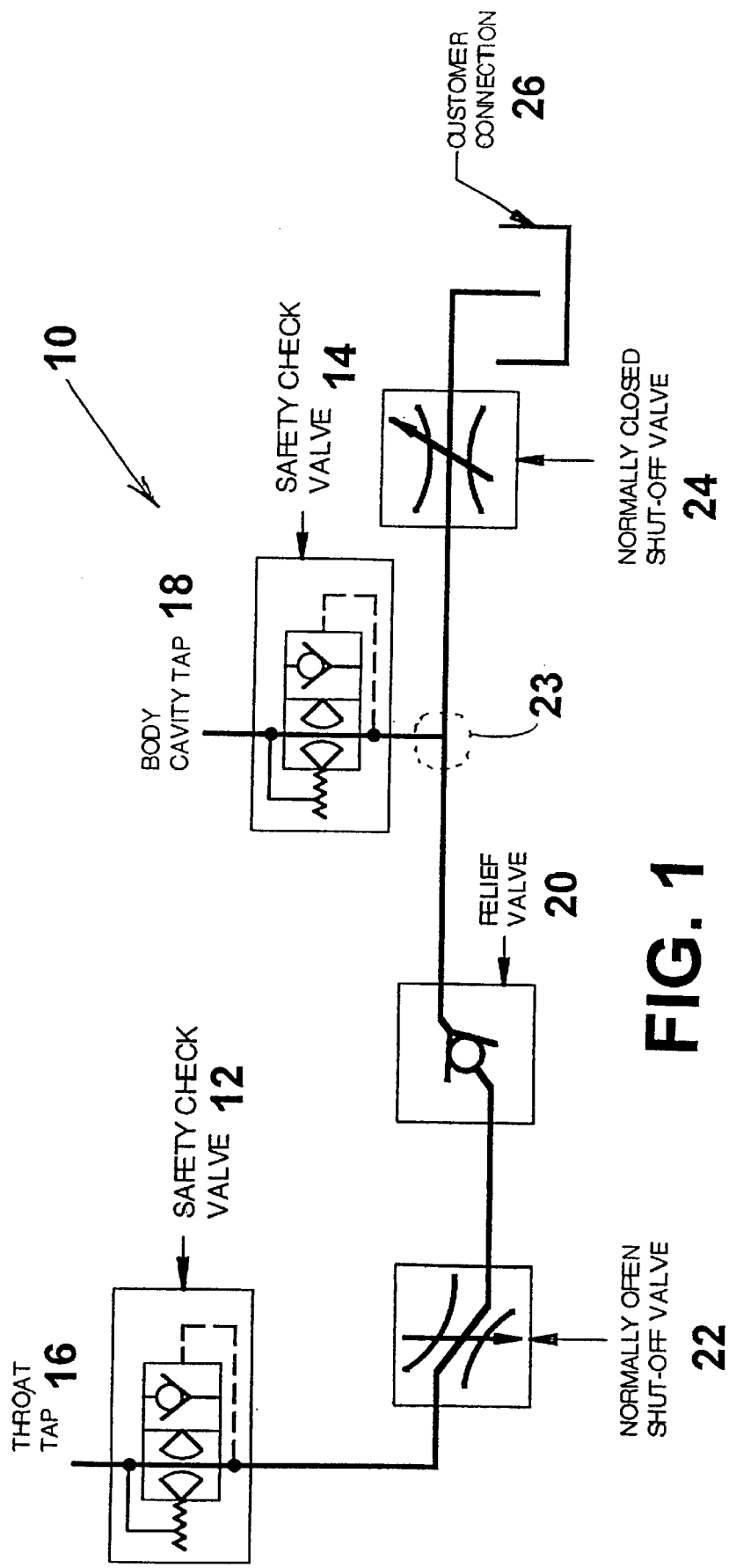
FIG. 1 is a schematic diagram of an improved bleed system in accordance with the inventive features disclosed herein.

Referring initially to FIG. I of the accompanying drawings, it will be seen that a first embodiment bleed system 10 comprises a pair of safety check valves 12 and 14, a pressure relief valve 20, a normally open shut-off valve 22 and a normally closed shut-off valve 24. Safety check valve 12 is connectable to the throat of a plug valve by means of a throat 16. Safety check valve 14 is connectable to the body of a plug valve by means of a body 18.

Figure 4:
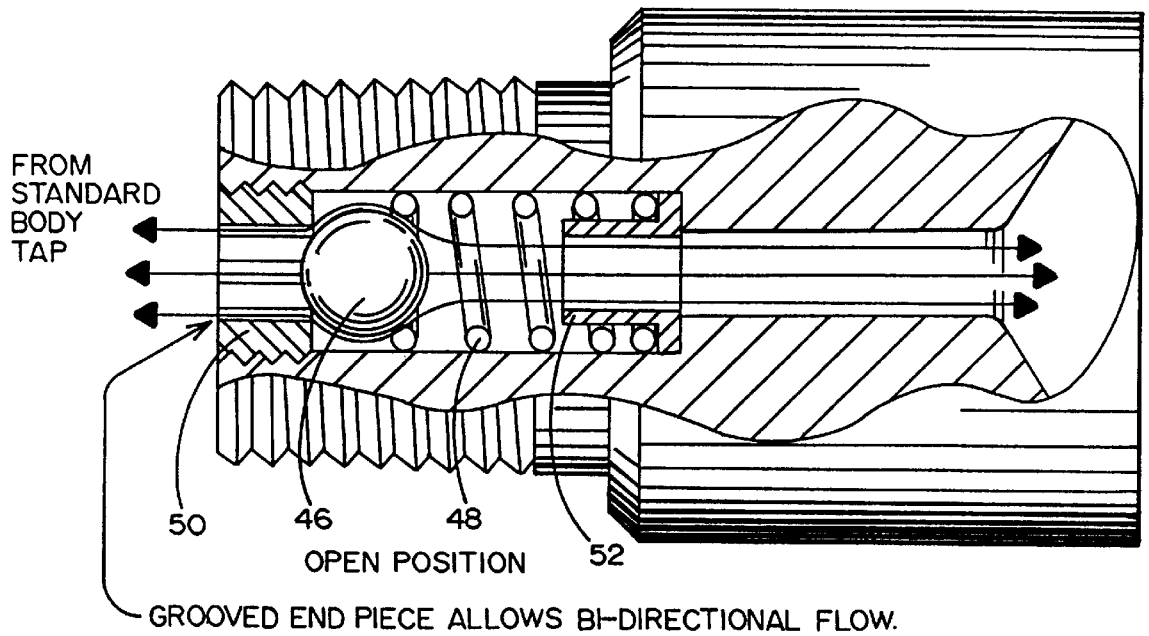
FIG. 4 is an enlarged cutaway view of a safety check valve used in the invention and shown in its open position.
Figure 5:
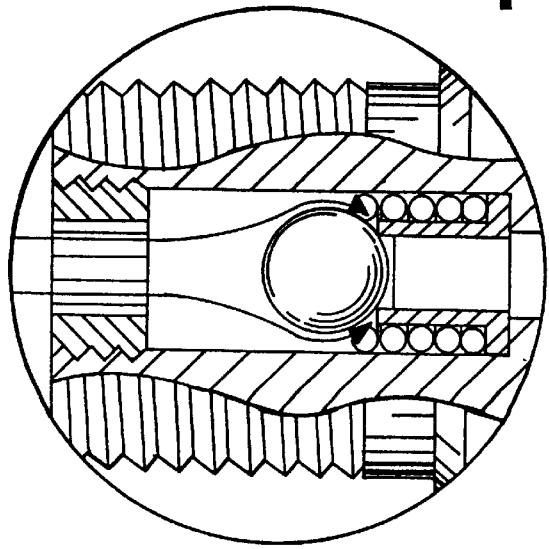
FIG. 5 is an enlarged cutaway view of the safety check valve of FIG. 4 shown in a closed position.

The detailed structure of safety check valves 12 and 14 may be better understood by referring to FIGS. 4 and 5. FIG. 4 illustrates the safety check valve in the open position. FIG. 5 illustrates the safety check valve in the tripped position. A spring-loaded ball 46 remains in the open (bidirectional) position during normal system operation. Spring 48 keeps the ball 46 in the open position. A grooved end piece 50 assures bi-directional flow in the open position. If a bleed line rupture occurs or a manual bleed valve is left open inadvertently, the ball 46 and spring 48 are subject to the pressure of the rupture or flow from an open bleed valve. Spring 48 is compressed and ball 46 immediately moves to the tripped position against a ball seat 52. The ball thus stops uncontrolled release of system media. When pressure equalizes through the bleed system, the spring 48 automatically resets the ball 46 and opens the safety check valve.

Returning to FIG. 1, it will be seen that safety check valve is connected to a normally open shut-off valve 22 and a pressure relief valve 20. Check valve 18 is connected to the bleed system 10 through a tee 23 located between relief valve 20 and a normally closed shut-off valve 24, the latter providing a connection 26 to route bleed flow to a customer's reservoir.

Figure 2:
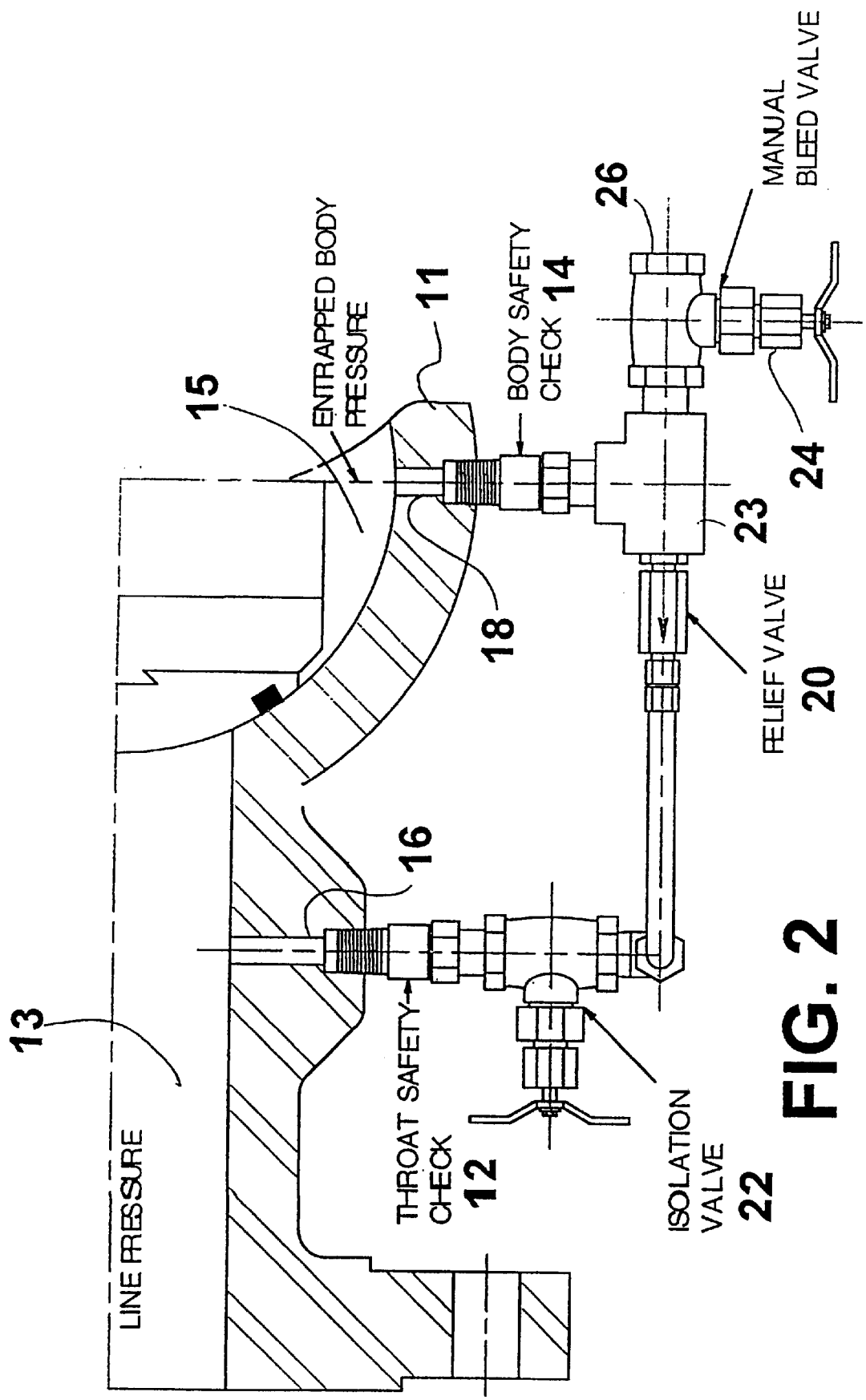
FIG. 2 is a diagrammatic illustration of a first embodiment bleed system implementing the characteristics shown in FIG. 1.

Implementation of the bleed system 10 of FIG. 1 is shown in FIG. 2. Shown therein is a double block plug valve 11 including a throat portion 13 thereof and the body cavity 15 thereof. As shown further in FIG. 2, safety check valve 12 is connected through throat 16 to throat portion 13 which is at line pressure. Safety check valve 14 is connected through body top 18 to body portion 15 which is at an elevated, entrapped pressure. The remaining components, including valve 20, valve 22, valve 24 and tee 23, are all interconnected in the manner schematically represented in FIG. 1.

Figure 3A:
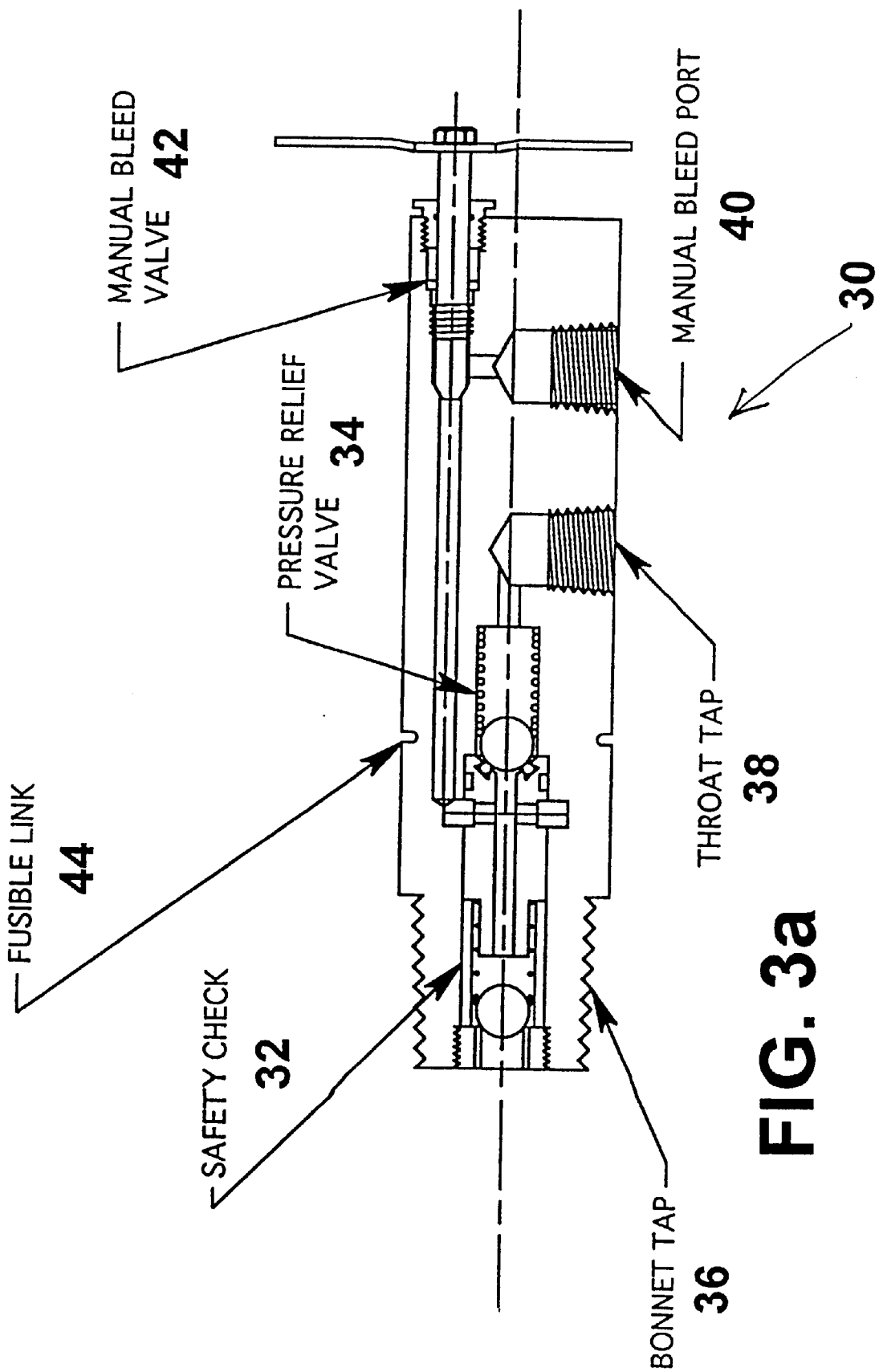
FIG. 3a is a diagrammatic illustration of a component of a second embodiment bleed system implementing the characteristics shown in FIG. 1.
Figure 3B:
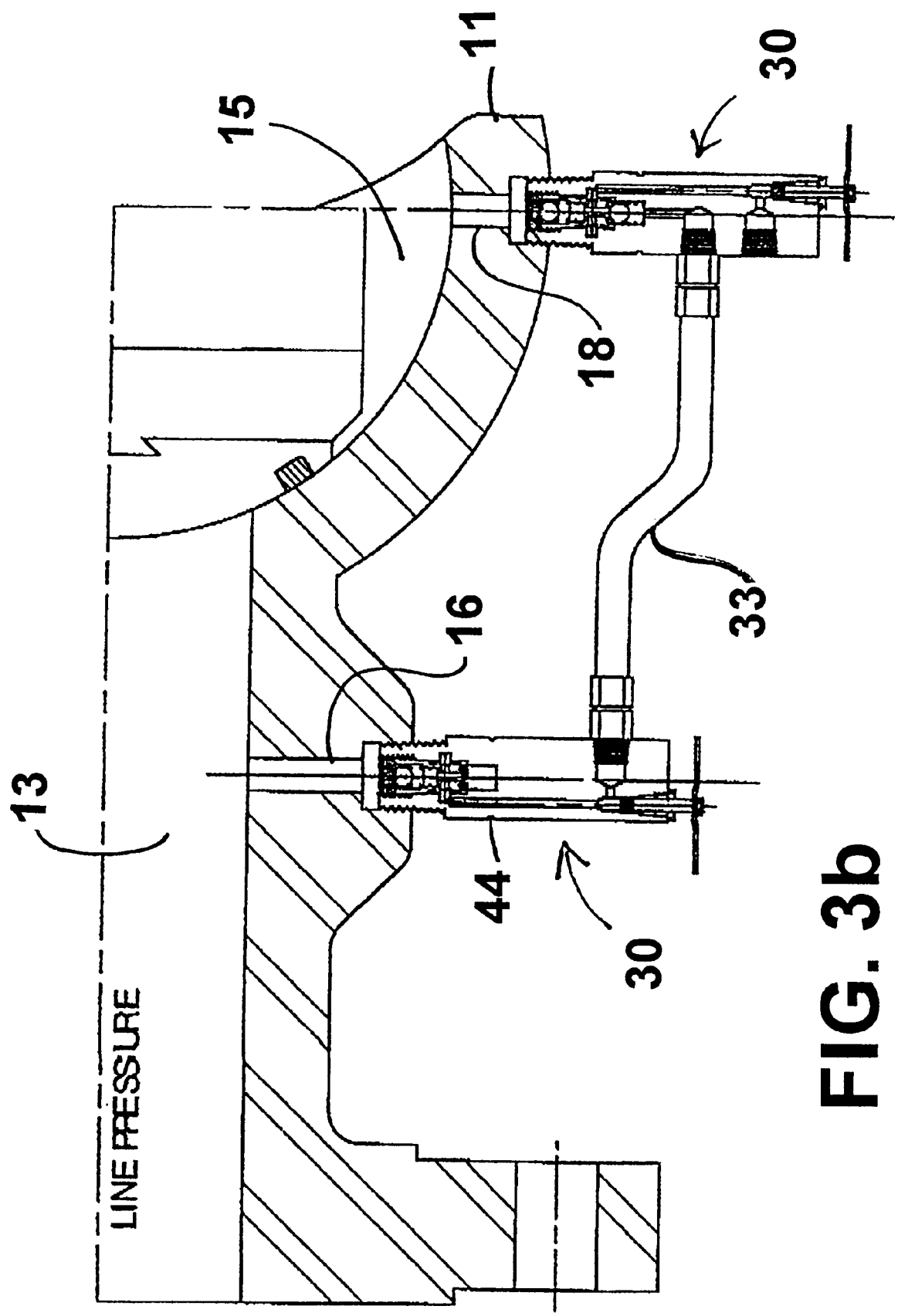

An alternative implementation is illustrated in FIG. 3a. The alternative bleed system 30 of FIG. 3a comprises safety check valve 32, pressure relief valve 34, bonnet or body 36, throat 38, manual bleed port 40 and manual bleed valve 42. Each of these components serves the same function as discussed above in regard to FIGS. 1 and 2. In the alternative embodiment of FIG. 3a many of the components (including an internal tee) are integrated into a unitary device. This is a significant feature of the embodiment of FIG. 3a because it further reduces cost and incident vulnerability. FIG. 3b illustrates the manner in which bleed system 30 (actually two such systems) is connected to plug valve 11 using an intermediate tube 33. A further feature of bleed system 30 is fusible link 44. Link 44 comprises a reduced diameter notch which is intentionally made more frangible than the remainder of the system 30 so that upon severe impact, the bleed system will break downstream of the safety check valve thereby protecting the check valve and bonnet tap to preserve its bleed system incident control characteristics under even extreme conditions.

It will therefore be seen that the invention herein disclosed meets all of the aforementioned objects of invention and thus provides a significant improvement over prior art bleed system for double block plug valves.

Having thus described presently preferred embodiments of the invention, it being understood that the described embodiments are illustrative and not limiting of the scope of protection afforded hereby, what we claimed is:

1. A bleed system connected between the body cavity and throat cavity of a double block plug valve for relieving entrapped body pressure when the plug valve is closed; the bleed system comprising:

a first safety check valve connected to said plug valve at said body cavity; and a second safety check valve connected to said plug valve at said throat cavity;

each said safety check valve having a spring-biased ball shaped flow control device permitting bi-directional flow at rates below a selected threshold and shutting off flow in one direction at rates exceeding said threshold.

2. The bleed system recited in claim 1 further comprising a pressure relief valve positioned between said first and second safety check valves for permitting flow between said body cavity and said throat cavity when said entrapped body pressure exceeds pressure in said throat cavity by a selected threshold pressure.

3. The bleed system recited in claim 2 further comprising a tee connected between said first safety check valve and said pressure relief valve, said tee providing a separate bleed port for directing bleed flow from said body cavity to a reservoir.

4. The bleed system recited in claim 3 further comprising a manual bleed valve connected to said bleed port of said tee.

5. A bleed system connected between the body cavity and throat cavity of a double block plug valve for relieving entrapped body pressure when the plug valve is closed; the bleed system comprising:

a safety check valve connected to said plug valve at said body cavity; and said safety check valve having a spring-biased ball shaped flow control device permitting bi-directional flow at rates below a selected threshold and shutting off flow in one direction at rates exceeding said threshold.

6. A bleed system connected between the body cavity and throat cavity of a double block plug valve for relieving entrapped body pressure when the plug valve is closed; the bleed system comprising:

a unitary, integral flow control device having at least one safety check valve connected through a tee to a pressure relief valve and to a manual bleed valve and bleed port, the safety check valve connected to the body cavity and the pressure relief valve connected to the throat cavity;

said safety check valve having a spring-biased ball-shaped flow control device permitting bi-directional flow at rates below a selected threshold and shutting off flow in one direction at rates exceeding said threshold.

* * * * *